United States Patent
Wang

(10) Patent No.: US 7,782,901 B2
(45) Date of Patent: Aug. 24, 2010

(54) TRAFFIC LOAD CONTROL IN A TELECOMMUNICATIONS NETWORK

(75) Inventor: Yalou Wang, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 506 days.

(21) Appl. No.: 11/651,213

(22) Filed: Jan. 9, 2007

(65) Prior Publication Data

US 2008/0165687 A1    Jul. 10, 2008

(51) Int. Cl.
*H04J 3/16* (2006.01)
(52) U.S. Cl. .................................. 370/468; 370/252
(58) Field of Classification Search ................. 370/229, 370/338, 395, 468, 252, 465; 455/436, 453
See application file for complete search history.

(56) References Cited

U.S. PATENT DOCUMENTS

| | | | |
|---|---|---|---|
| 6,212,200 B1 * | 4/2001 | Iizuka et al. ................ | 370/468 |
| 7,450,944 B2 * | 11/2008 | Leelahakriengkrai et al. .... | 455/436 |
| 2004/0205752 A1 | 10/2004 | Chou et al. ................ | 718/100 |
| 2005/0050246 A1 | 3/2005 | Lakkakorpi et al. .......... | 710/36 |
| 2005/0227699 A1 * | 10/2005 | Schreuder et al. ........... | 455/453 |
| 2005/0282572 A1 | 12/2005 | Wigard et al. ............... | 455/522 |
| 2006/0126580 A1 * | 6/2006 | Katsumata et al. .......... | 370/338 |
| 2006/0215690 A1 * | 9/2006 | Wilson et al. ............... | 370/465 |
| 2007/0081456 A1 * | 4/2007 | Gorti et al. ................. | 370/229 |
| 2007/0115812 A1 * | 5/2007 | Hughes ...................... | 370/229 |
| 2008/0165695 A1 * | 7/2008 | Charzinski et al. .......... | 370/252 |

FOREIGN PATENT DOCUMENTS

WO PCT/US/2008/000149    5/2008

* cited by examiner

*Primary Examiner*—Kwang B Yao
*Assistant Examiner*—Syed Bokhari

(57) ABSTRACT

A method is provided of controlling traffic load on a link in a telecommunications network. The link carries user sessions of non-real time, NRT, and real time, RT, services. The method comprises periodically monitoring traffic load on the link in the network. The method further comprises successively restricting alternately NRT and RT traffic on said link so as to bring said load below a predetermined level.

9 Claims, 4 Drawing Sheets

US 7,782,901 B2

TRAFFIC LOAD CONTROL IN A TELECOMMUNICATIONS NETWORK

FIELD OF THE INVENTION

The present invention relates to telecommunications, in particular to wireless telecommunications.

DESCRIPTION OF THE RELATED ART

In modern telecommunications networks, the need to provide multiple types of service has become increasingly important. For example, it is important to provide Quality of Service, QoS, guarantees for real time, RT, services. RT services are such as media streaming, voice/video conversations, and multimedia broadcasting.

Since a network is shared by many users, each service session needs an appropriate share of the call-carrying capacity, i.e. bandwidth, at each link in the network supporting the service session. As such capacity is limited, there are often problems of congestion.

A known way of controlling bandwidth at a congested link is to reduce the allowed rate for non-real time, NRT, service sessions. The aim is to ensure that there is enough bandwidth for real time, RT, service sessions. There are many known methods for such NRT traffic control, such as traffic shaping and rate based flow control.

Specifically in Universal Mobile Telecommunications System (UMTS) networks, there are interfaces, which are known as Iub interfaces, between base station controllers (radio network controllers, RNC) and the base stations that they control. The known approach to control traffic on these Iub interfaces is to reduce the transmission rate of NRT sessions, specifically of Interactive and Background UMTS QoS classes, whilst not limiting the transmission rate of RT sessions.

SUMMARY OF THE INVENTION

When considering known systems, the inventor realized that the known approaches to bandwidth control seek to reduce the amount of non-real time, NRT, traffic, but do not restrict RT traffic on the assumption that RT traffic should always have priority. The inventor realized that this assumption may be false.

A method is provided of controlling traffic on a link in a telecommunications network. The link carries user sessions of non-real time and real time services. The method comprises periodically monitoring traffic load on the link. The method further comprises successively restricting alternately NRT and RT traffic on the link so as to bring said load below a predetermined level.

BRIEF DESCRIPTION OF THE DRAWINGS

Embodiments of the present invention will now be described by way of example and with reference to the drawings, in which.

DETAILED DESCRIPTION

When considering known systems, the inventor realized that the known approaches involve control of non real time (NRT) traffic, but real time (RT) traffic however also needs to be controlled in an appropriate way. The inventor considered this to be for for the following reasons:

(1) The argument that RT traffic should always be handled with higher priority than NRT traffic is sometimes not valid. As regards user's perceived performance, NRT service session degradation, such as slow response when web-browsing and long time of file downloading, can be unacceptable.

(2) In some networks, there is a need to differentiate user's traffic regardless of which application, NRT or RT, is being used by a user. For example some networks apply, and charge for applying, stricter quality of service, QoS, requirements to traffic of some users as compared to others. An example is gold, silver and bronze QoS assured users. Users subscribing to gold QoS might be emergency service providers, e.g. police, ambulance, fire brigade and other governmental agencies, that expect highest priority. Silver users may be corporate customers who paid a premium so expect a high QoS. Bronze users may be occasional consumer users who pay less and can accept so-called best-effort performance.

(3) Many RT service sessions can be downgraded without terminating the session. These downgrades normally mean either an on-the-fly media codec rate reduction, or a radio bearer reconfiguration, so that less bandwidth is required. If a gold user is having an NRT service session and the link becomes congested, it may well be preferable to downgrade handling of a bronze user's RT service session, rather than downgrade handling of the gold user's NRT service session.

(4) In some cases, especially in a telecommunications system made up of networks of different types, traffic off-loading, also known as load-balancing, can be performed to move some of the users to another link in a network, or another network. A typical scenario is in Third Generation, 3G, networks, such as UMTS networks, where Second Generation, 2G, network has an overlapping radio coverage area. There some 3G voice services can be off-loaded onto the 2G network, so as to leave users of data services on the 3G network to enjoy high data rates.

The inventor made his invention, embodiments of which are described below.

First Example Network

Figure 1:
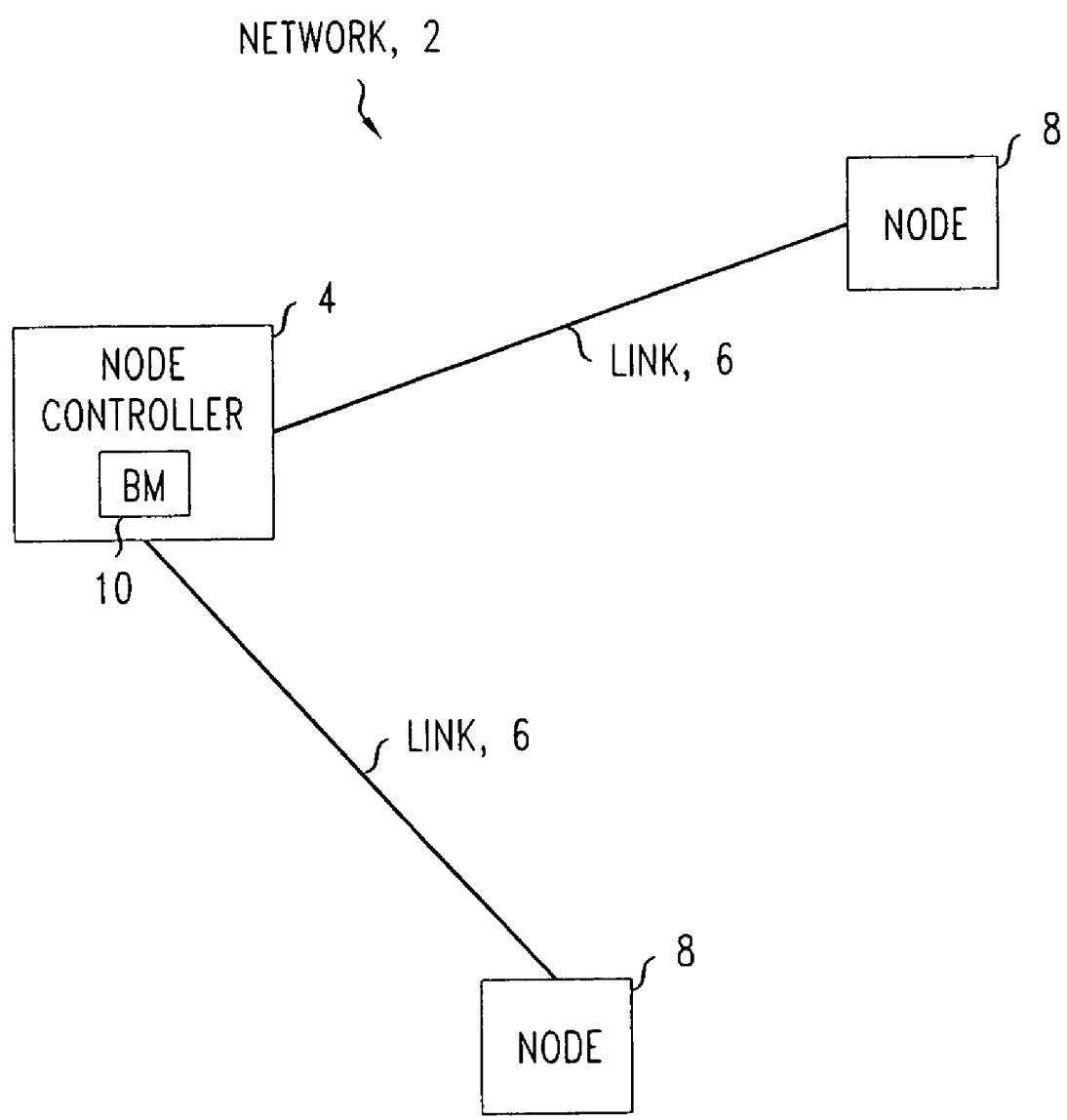
FIG. 1 is a diagram illustrating a telecommunications network.

As shown in FIG. 1, an example network 2 consists of a node controller 4 including a link 6 to a node 8. The node controller includes a bandwidth manager 10.

Bandwidth Manager

The bandwidth manager 10 is a traffic controller that resides in the node controller 4 of a link 6 to be controlled. The bandwidth manager 10 has a number of tasks. Firstly, it monitors the link load either continuously or periodically, and triggers a traffic control function if the link load, LL, exceeds a traffic congestion threshold, Th_TC. This threshold Th_TC can be a fixed percentage of the total link bandwidth, e.g. 95%, or a fixed traffic volume per unit time value.

Secondly, the bandwidth manager 10 maintains a table including sets of bandwidth thresholds to be applied to various QoS groups of real time traffic, and also sets of bandwidth thresholds to be applied to various QoS groups of non-real time traffic.

Thirdly, the bandwidth manager 10 performs the traffic reduction when congestion occurs, by steps of calculating the amounts of reduction required for certain types of traffic according to the table and reducing ingress of those types of traffic appropriately. This is described in more detail in respect of FIG. 2 below.

Fourthly, if necessary the bandwidth manager performs load balancing, namely moving some traffic to another link 6 so as to reduce traffic over a first link 6.

Fifthly, if necessary to control congestion the bandwidth manager 10 releases selected user sessions, in other words drops user sessions, starting with users of the lowest QoS group.

Link Congestion Control Method

An example method that is used by the bandwidth manager 10 to control link congestion will now be described.

An underlying principle is one of progressively adding restrictions or sets of restrictions according to respective QoS group, to real time and non-real time traffic alternately, according to a stored table of thresholds, until congestion is overcome. The restrictions are defined in a stored table of thresholds.

Table 1 shows one example, among many possibilities, of the stored table of thresholds. This table shows a series of thresholds for NRT traffic, NRT_I (I=1, 2, 3, . . . , N), and a series of thresholds for RT traffic, RT_I (I=1, 2, 3, . . . , N), all in kilobits per second. It also shows the initial maximum permitted rate ("base rate") in kilobits per second of each type of traffic, before congestion control restrictions are applied.

Figure 2:
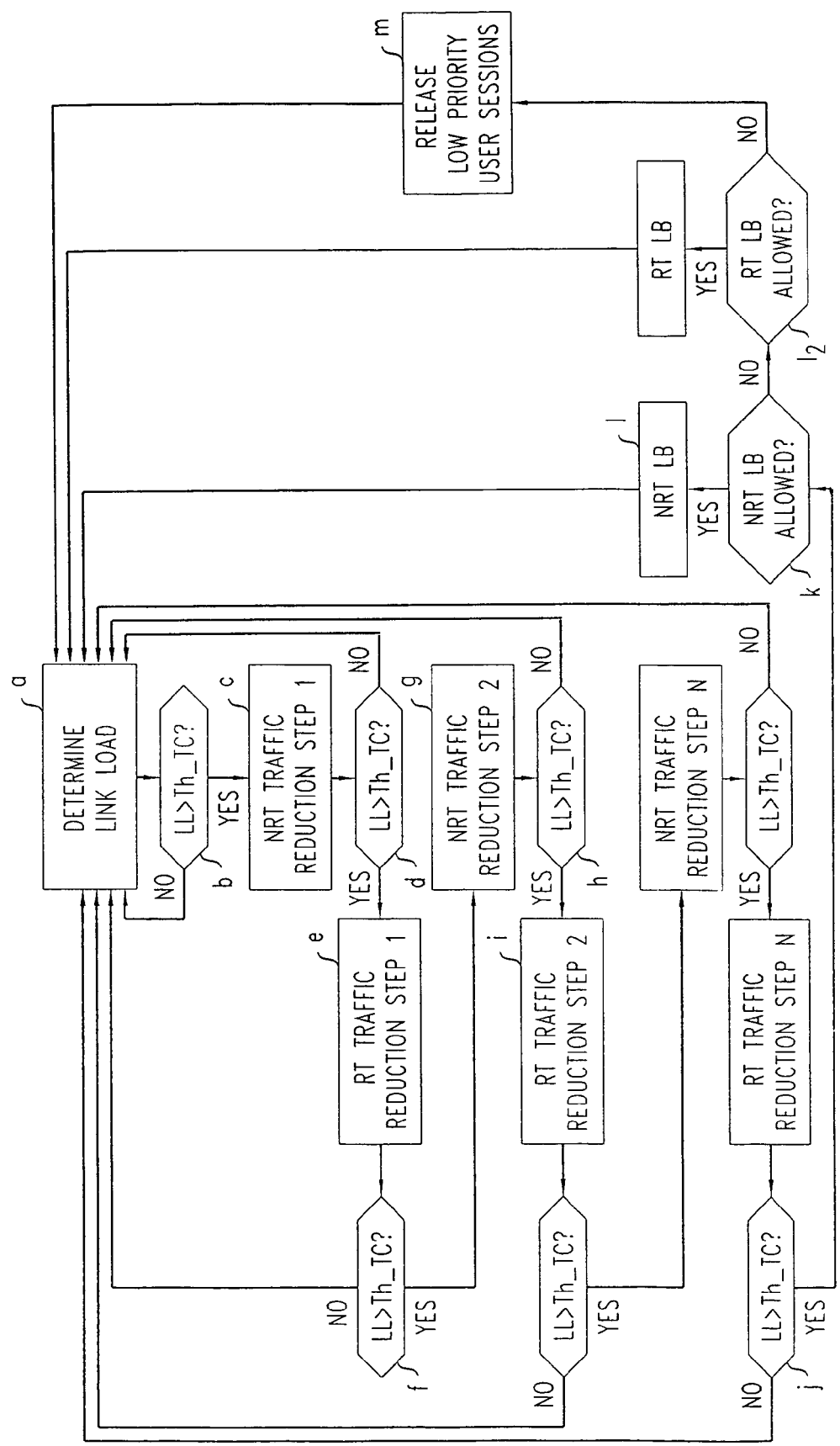
FIG. 2 is a diagram illustrating method of bandwidth control in a link of the network shown in FIG. 1.

FIG. 2 shows an example of the congestion control process that occurs in the bandwidth manager 10. The process is as follows.

The bandwidth manager 10 determines the link load, LL, level (step a). This determination of LL level is done at set intervals, such as every 20 milliseconds, else continuously. A check is made (step b) as to whether the load level LL is below the congestion control threshold Th_TC, Whilst link load (LL) is below Th_TC, all user sessions can use up to the maximum permitted rate ("base rate") for the relevant type of session.

If LL exceeds Th_TC, then a first step (step c) of traffic reduction is applied, namely new set of bandwidth thresholds NRT-1 is applied to NRT traffic as shown in Table 1. For example, the maximum permitted rate for a session of a NRT QoS group 1 user remains at 800 kbps whilst the maximum permitted rate for a session of a NRT QoS group 2 user is reduced to 600 kbps and maximum permitted rate for a session of a NRT QoS group 3 user is reduced to 400 kbps.

A check is then made (step d) as to whether LL is less than Th_TC now that restrictions NRT-1 have been applied. If LL still exceeds Th_TC a further traffic reduction is applied (step e), this time to RT traffic, specifically a set of bandwidth thresholds RT_1 applied to RT traffic as shown in Table 1. Specifically, the maximum permitted rate for a session of a RT QoS group 1 user remains at 500 kbps whilst the maxi-

TABLE 1

Example thresholds for congestion control

| User QoS/Priority | Base rates (kbps) | | NRT and RT traffic bandwidth thresholds (kbps) | | | | | | |
|---|---|---|---|---|---|---|---|---|---|
| Group | NRT | RT | NRT_1 | RT_1 | NRT_2 | RT_2 | ... | NRT_N | RT_N |
| 1 | 800 | 500 | 800 | 500 | 600 | 400 | ... ... | 200 | 200 |
| 2 | 800 | 500 | 600 | 400 | 400 | 300 | ... ... | 100 | 80 |
| 3 | 800 | 500 | 400 | 300 | 200 | 200 | ... ... | 50 | 30 |

As will be seen in Table 1, the types of traffic are split according to whether they relate to non real time (NRT) or real time (RT) services and according to QoS group. Users in QoS group 1 pay for and expect better quality of service than QoS group 2, whilst QoS group 3 are given least QoS assurances. Of course, in other otherwise similar embodiments, there may be more than three QoS groups.

The base rates shown in Table 1 are the maximum permitted rates for individual user sessions before restrictions are applied; these are also known as maximum user bearer rates or user link layer rates. Of course, for NRT traffic, the instantaneous date rate of a user session could be anywhere between 0 and 1 times maximum permitted rate, due to burstiness of this type of traffic. For RT traffic, the instantaneous data rate will have much less fluctuation but will also be less than the corresponding maximum permitted rate.

The thresholds indicate the maximum allowed rate for each call session of each type depending on which set of thresholds for NRT traffic NRT_I (I=1, 2, 3, . . . N) and which thresholds for RT traffic, RT_I (I=1, 2, 3, . . . , N) are currently applied.

Note that the actual rates are given in Table 1 are merely examples. In some alternative, but otherwise similar, embodiments, thresholds are given as percentages of base rates, as this can be an easier way to indicate thresholds where there are many traffic types having many different base rates.

mum permitted rate for a session of RT QoS group 2 user is reduced to 400 kbps and the maximum permitted rate for a session of an RT QoS user is reduced to 300 kbps.

In this way, in a congestion control cycle, NRT traffic is restricted first, followed by restriction of RT traffic if the restriction of NRT traffic was not enough to bring the link load LL below the necessary threshold, Th_TC.

The actual mechanism by which maximum permitted rates are applied are well-known, for example buffering packets so as to regulate flow rates, source output rate control, and randomly discarding packets.

After this first cycle of traffic control, a check is made (step f) whether LL still exceeds Th_TC. If yes, further traffic control is undertaken, namely a second step F (step g) of NRT traffic reduction by applying a further set of thresholds NRT_2 to NRT traffic. Specifically, as shown in Table 2, the maximum permitted rate for a session of a NRT QoS group I user is reduced to 600 kbps, the maximum permitted rate for a session of a NRT QoS group 2 user is reduced to 400 kbps, and the maximum permitted rate for a session of a NRT QoS group 3 user is reduced to 300 kbps.

Again a check is made (step h) whether link load (LL) is grater than Th_TC, and if so, a second step (step i) of RT traffic reduction is made by applying a further set of thresholds RT_2, to RT traffic. Specifically, as shown in Table 2, the maximum permitted rate for RT QoS group 1 users is reduced to 400 kbps, the maximum permitted rate for RT QoS group 2 user is reduced to 300 kbps and the maximum permitted rate for RT QoS group 3 user is reduced to 200 kbps.

Thus a second cycle of NRT then RT traffic restriction has been made. As shown in FIG. 2, whilst LL>Th_TC such cycles are repeated with increasingly stringent maximum permitted rate thresholds being applied until an Nth cycle is applied, N being a predetermined number that is 2 or more, for example 5. In the last cycle, maximum permitted rates for the NRT QoS groups and RT QoS groups are as shown in the right hand side of Table 2.

After all such reductions in maximum permitted rates, a check is made (step j) whether LL still exceeds Th_TC. If yes, further approaches to reduce link load are required. First a check is made (step k) whether load balancing of NRT traffic is possible. This is shown by the bandwidth manager 10 obtaining information as to the link load levels of other links. If they have spare capacity, some NRT user sessions are transferred (step l) to those links instead.

If NRT load balancing is not possible, it may nevertheless be possible to load balance RT traffic so a check is made (step $l_2$) in that regard. If yes, some real time user sessions are transferred to appropriate other links (step m).

In some other, otherwise similar, embodiments, load balancing does not occur to NRT traffic first. Often transferred-to links have inferior performance or are only suitable for particular types of traffic, so it is usually only user sessions of users in low QoS groups that are transferred.

As shown in FIG. 2, if load balancing is not possible, then as a last resort some user sessions are terminated (step m), starting with user sessions of users of the lowest QoS group first.

In other, otherwise similar, embodiments, a check is made after load balancing whether LL>Th_TC and if so some user sessions are then terminated.

Relaxation of Maximum Permitted Rate Restrictions

At any stage in the congestion control process, as traffic levels ease, for example due to a decrease in the number of users, the bandwidth manager 10 accordingly relaxes the bandwidth thresholds, i.e. increases maximum permitted rates in an appropriate step or series of steps in accordance with Table 2. After each relaxation, for example RT_2 to RT_1, an assessment is made whether LL is less than Th_2, where Th_2 is less than Th_TC. If yes, a further relaxation, for example NRT_2 to NRT_1 is made.

In this way, basically speaking, congestion control is provided only when load level is too high.

One advantage of the above approach is that control can be applied to both NRT and RT traffic relatively gradually. As it is not just NRT traffic that is restricted, this may be considered as a fairer approach then that of known systems.

The network operator has many choices in selecting maximum permitted rates for different traffic types in different congestion control cycles. For example if the network operator wants a RT-centric network, high maximum permitted rates for RT traffic are set, in other words the series of thresholds RT_I (I=1, 2, 3, . . . , N) are kept relatively high whilst the thresholds NRT_I (I=1, 2, 3, . . . , N) for NRT traffic are more stringent.

On the other hand, if the network operator wants an NRT-centric network, high maximum permitted rates for NRT traffic are set, in other words the series of thresholds NRT_I (I=1, 2, 3, . . . , N) are kept relatively high whilst the thresholds RT_I (I=1, 2, 3, . . . , N) NRT traffic are made more stringent.

Another option is to set both sets of thresholds NRT_L (I=1, 2, 3, . . . , N) and RT_I (I=1, 2, 3, . . . , N) high, in which case there is little change to data traffic rates but more use of load balancing and session-release to relieve congestion.

Second Example

Application in a 3G UMTS Network

The detailed description so far is general to many types of links between nodes in many types of telecommunications networks, for example: Universal Mobile Telecommunications System (UMTS) networks; CDMA2000 wireless networks; 4G mobile networks such as Third Generation Partnership Project, 3GPP, Long Term Evolution, LTE, networks; and networks using shared IP transport channels.

We now describe an example of how the above approach is implemented in an example Third Generation Partnership Project, 3GPP, Universal Mobile Telecommunications System, UMTS, network.

In the below example, the link, the loading of which is at issue, is a so-called Iub interface, and the base station controller at which its bandwidth manager is located is the radio network controller, RNC.

UMTS Network

Figure 3:
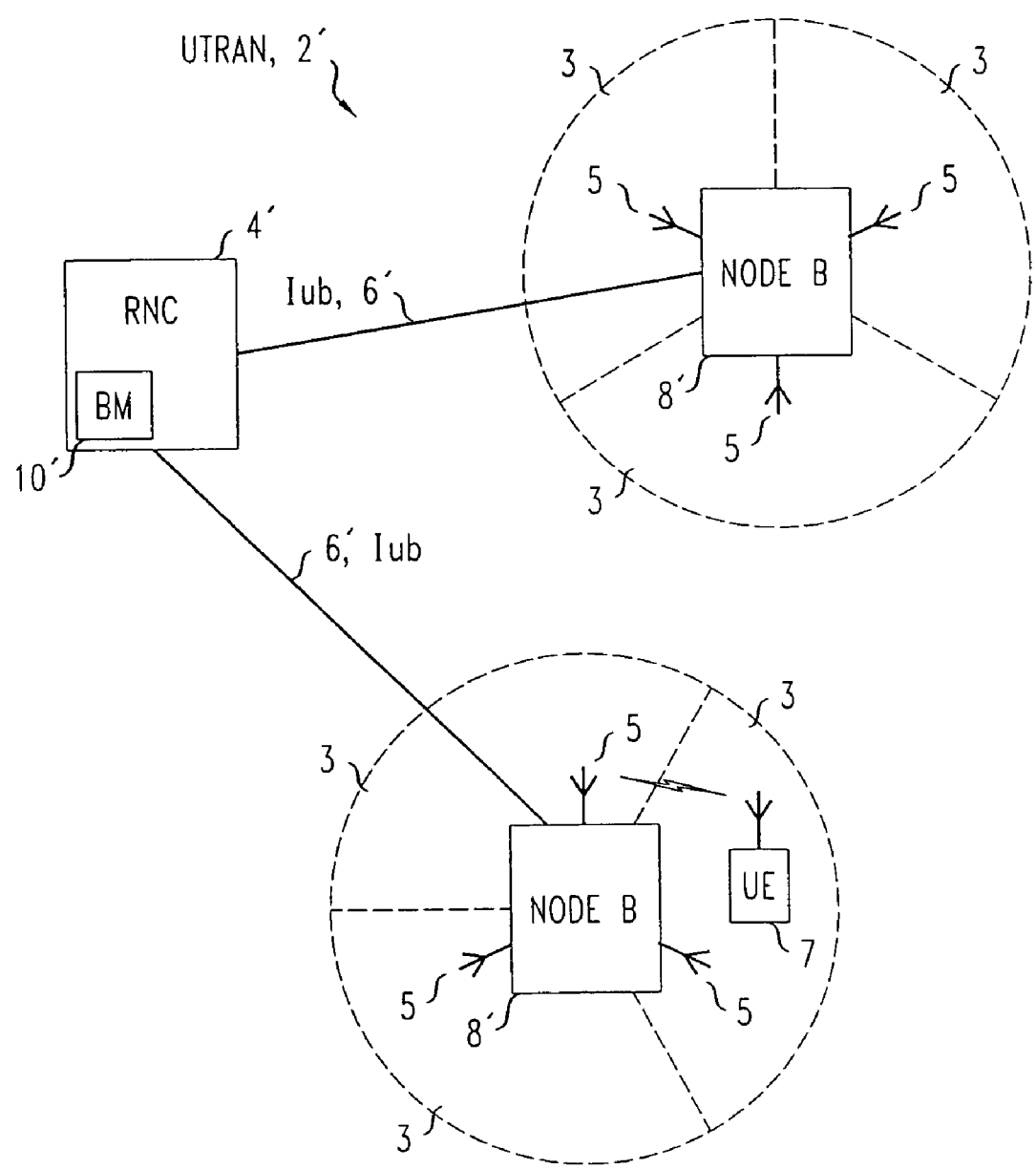
FIG. 3 is a diagram illustrating a UMTS telecommunications network.

As shown in FIG. 3, in this second example, the network is a Universal Mobile Telecommunications System (UMTS) terrestrial access network (UTRAN), which is a type of wideband code division multiple access (CDMA) network for mobile telecommunications. The UTRAN network is basically as shown in FIG. 3. Only one radio network controller 4' and two base stations 8' of the UTRAN network 2' are shown for simplicity. As shown in this Figure, the UTRAN network 2' includes base stations 8'. In the Figure, each of the base stations 8' is also designated "Node B" in accordance with UMTS terminology. A cell, also referred to as a sector, is the radio-coverage area served by a corresponding antenna of a base station. Each base station typically has three cells 3, each covered by one of three directional antennas 5 angled at 120 degrees to each other in azimuth. Each radio network controller (RNC) 4' typically controls several base stations 8' and hence a number of cells 3. A base station 8' is connected to its controlling radio network controller (RNC) 4' via a respective interface 6' known as an Iub interface. In use, a mobile user terminal 7 (often referred to as User Equipment (UE) in UMTS terminology) communicates with a serving radio network controller (RNC) 4' via at least one cell 3 of at least one base station 8'. In that way, the mobile user terminal communicates with the UTRAN network 2.

Each radio network controller, RNC, 4' includes a bandwidth manager 10'. In a UMTS network 2' rate reduction of some RT services is possible, for example Adaptive Multi-Rate (AMR) voice rate adaptation, and streaming bearer down-grading. Also, as regards load balancing, off-loading traffic from a UMTS network to a second generation network, such as a GSM network, is often possible; in particular off-loading voice user sessions and lower rate data user sessions whilst keeping higher rate data sessions in the UMTS network. Also in a UMTS network, it is known for different users to be assured different QoS, defined by QoS class.

The inventor realized that, say, a voice user having a lower QoS class should not necessarily be given a higher priority than a data user having a higher QoS class.

In a UMTS network, the Iub interface 6' carries multiple types of service including voice, video and data. Bandwidth on the Iub interface 6' is limited, but as data services are often bursty, the Iub interface 6' often is deliberately oversubscribed. This is known as statistical multiplexing. This is acceptable because at an instant, it is very unlikely that all users are using the maximum of their allowed data rates. The aim of congestion control of the Iub interface is to appropriately meet requested QoS whilst maintaining a high level of use of the Iub interface.

Figure 4:
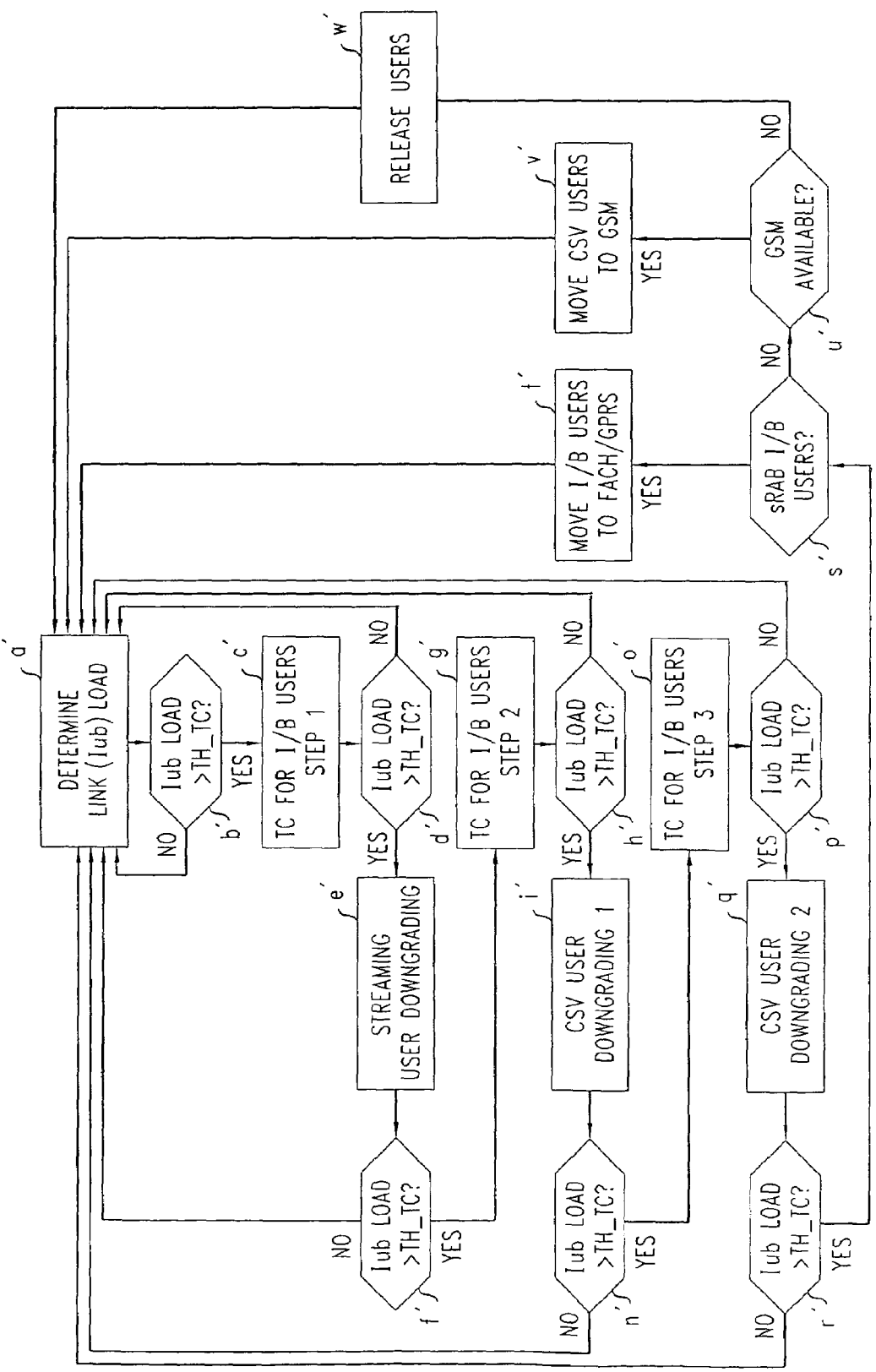
FIG. 4 is a diagram illustrating the method of bandwidth control as applied in a link of the UMTS network shown in FIG. 3.

FIG. 4 shows an example of the congestion control method described generally in respect of FIGS. 1 and 2 above, but now applied in the UMTS network shown in FIG. 3, and with a different table of threshold values. FIG. 4 shows three cycles of NRT then RT traffic control followed by load balancing then releasing user sessions.

There are two non real time (NRT) types of traffic in a UMTS system. These are Interactive class and Background class. There are various levels of QoS associated with NRT user sessions. Specifically there are three basic levels of QoS priority, known as Traffic Handling Priority (THP), for Interactive class traffic, namely Interactive1 (highest priority), Interactive2 (medium priority), and Interactive3 (lowest priority).

Classes of real time (RT) traffic are Streaming class and Conversational class. Traffic in Streaming class includes RT multimedia traffic such as for streaming video and streaming audio applications. Circuit Switched Voice, CSV, traffic falls within the Conversational class.

As shown in Table 2, three sets of maximum permitted rates are used based on traffic class priority. In Table 2, N/A denotes Not Applicable.

Whilst Iub load is below Th_TC, all user sessions can use up to the maximum permitted rate ("base rate") for the relevant type of session.

If Iub load exceeds Th_TC, then a first step (step c') of traffic reduction is applied, namely new set of bandwidth thresholds I/B_1 are applied to NRT traffic, namely of Interactive and Background classes, as shown in Table 2. Specifically, the maximum permitted rate for a session of an Interactive1 or Interactive2 class of user remains at 384 kbps whilst the maximum permitted rate for a session of an Interactive3 class of user is reduced to 256 kbps and maximum permitted rate for a session of a Background class of user is reduced to 128 kbps.

A check is then made (step d') as to whether Iub load is less than Th-TC now that restrictions I/B_1 restrictions have been applied. If Iub load still exceeds Th_TC a further traffic reduction is applied (step e'), this time to some RT traffic, specifically a bandwidth threshold Str_min is applied to RT traffic of Streaming class as shown in Table 2. The maximum permitted rate for a session of a RT Streaming class user is reduced to 64 kbps. The maximum permitted rate for a session of a RT user of CSV class is unaltered.

In this way, in a congestion control cycle some NRT traffic is restricted first, then some RT traffic if the restriction of NRT traffic was not enough to bring the Iub load below the necessary threshold, Th_TC.

TABLE 2

Example Thresholds for congestion control in a UMTS network.

| User QoS/ traffic type | Base rates (kbps) | | NRT and RT traffic bandwidth thresholds (kbps) | | | | | |
|---|---|---|---|---|---|---|---|---|
| | NRT | RT | I/B_1 | Str_min | I/B_2 | CSV_mid | I/B_min | CSV_min |
| CSV | N/A | 12.2 | N/A | N/A | N/A | 7.95 | N/A | 4.75 |
| Streaming | N/A | 128 | N/A | 64 | N/A | N/A | N/A | N/A |
| Interactive 1 | 384 | N/A | 384 | N/A | 256 | N/A | 128 | N/A |
| Interactive 2 | 384 | N/A | 384 | N/A | 128 | N/A | 64 | N/A |
| Interactive 3 | 384 | N/A | 256 | N/A | 64 | N/A | 32 | N/A |
| Background | 384 | N/A | 128 | N/A | 32 | N/A | 8 | N/A |

The thresholds in Table 2, although having different example values, correspond to the thresholds in Table 1 as follows:

NRT_1 corresponds to I/B_1,

RT_1 corresponds to Str_min (minimum rate for streaming)

NRT_2 corresponds to I/B_2,

RT_2 corresponds to CSV_mid (middle rate for CSV flows),

NRT_3 corresponds to I/B_min (minimum rate for I/B flows), and

RT_3 corresponds to CSV_min (minimum rate for CSV flows)

The bandwidth manager 10' monitors the traffic load on the Iub interface. When Iub load exceeds Th_TC, the traffic reduction procedure is undertaken applying as necessary, step-by-step, the thresholds of Table 2.

The bandwidth manager 10' determines the Iub load, level (step a'). This determination is done at set intervals, such as every 20 milliseconds, else continuously. A check is made (step b') as to whether the Iub load is below the congestion control threshold Th_TC, Whilst Iub load is below Th_TC, all user sessions can use up to the maximum permitted rate ("base rate") for the relevant type of session.

The restriction to NRT traffic is undertaken in practise by signalling the number of Protocol Data Units, PDUs, that a source, such as the user terminal or RNC, can send over the Iub interface. The restriction to RT traffic is undertaken in practise by UMTS bearer reconfiguration procedures.

After this first cycle of traffic control, a check is made (step f') whether Iub load still exceeds Th_TC. If yes, further traffic control is undertaken, namely a second step (step g") of NRT traffic reduction by applying a further set of thresholds I/B-2 to NRT traffic. Specifically, as shown in FIG. 4, the maximum permitted rate for a session of an Interactive1 class of user is reduced to 256 kbps, the maximum permitted rate for a session of an Interactive2 class of user is reduced to 128 kbps, the maximum permitted rate for a session of an Interactive3 class of user is reduced to 64 kbps and maximum permitted rate for a session of a Background class of user is reduced to 32 kbps.

Again a check is made (step h') whether Iub load>Th_TC, and if so, a second step (step i') of RT traffic reduction is made by applying a further restriction to RT traffic. Specifically a bandwidth threshold CSV_mid is applied to RT traffic of CSV class as shown in Table 4. The maximum permitted rate, initially 12.2 kbps, for a session of a RT CSV class user is reduced to 7.95 kbps. This is done using UMTS bearer reconfiguration procedures to reduce the CSV user codec rate, also known as Adaptive MultiRate, AMR. The maximum permitted rate for a session of a RT user of Streaming class is unaltered. Thus a second cycle of NRT then RT traffic restriction has been made.

As shown in FIG. 4, a further check is made (step n') as to whether Iub load>Th_TC. If so, a third cycle is entered step (step o') of NRT traffic reduction by applying a further set of thresholds I/B_min to NRT traffic. Specifically, as shown in FIG. 4, the maximum permitted rate for a session of an Interactive1 class of user is reduced to 128 kbps, the maximum permitted rate for a session of an Interactive2 class of user is reduced to 64 kbps, the maximum permitted rate for a session of an Interactive3 class of user is reduced to 32 kbps and maximum permitted rate for a session of a Background class of user is reduced to 8 kbps.

Again a check is made (step p') whether Iub load>Th_TC, and if so, a third step (step q') of RT traffic reduction is made by applying a further restriction to RT traffic. Specifically a bandwidth threshold CSV_min is applied to RT traffic of CSV class as shown in Table 4. The maximum permitted rate for a session of a RT CSV class user is reduced to 4.75 kbps. This is done using UMTS bearer reconfiguration procedures to reduce the CSV user codec rate. The maximum permitted rate for a session of a RT user of Streaming class is unaltered.

After all such reductions in maximum permitted rates, a check is made (step r') whether Iub load still exceeds Th_TC. If yes, further approaches to reduce Iub load are required. First a check is made (step s') whether load balancing of NRT traffic is possible, in particular whether there are user sessions of an Interactive or Background class, and using a single Radio Access Bearer as these are suitable for load balancing. If so, some of these NRT user sessions are transferred (step t') either to shared channels, known as Forward Access Channels, FACHs, or to 2G (General Packet Radio System, GPRS, networks.

If NRT load balancing is not possible, it may nevertheless be possible to load balance RT traffic so a check is made (step u') in that regard. If yes, some real time CSV user sessions are transferred (step v') to 2G (General Packet Radio System, GPRS,) networks.

As shown in FIG. 4, if load balancing is not possible, then as a last resort some user sessions are terminated (step w').

At any stage in the congestion control process, as traffic levels ease, for example due to a decrease in the number of users, the bandwidth manager 10' makes an assessment whether Iub load is less than Th_2, where Th_2 is less than Th_TC. If so, the bandwidth manager 10' accordingly relaxes the bandwidth thresholds, i.e. increases maximum permitted rates in an appropriate step or series of steps in accordance with Table 2. After each relaxation, for example CSV_min to CSV_mid, an assessment is made whether Iub load is less than Th_2. If yes, a further relaxation, for example I/B-min to I/B_2 is made.

In this way, basically speaking, congestion control is provided only when load level is too high.

Some Other Embodiments

In UMTS there is a parameter ARP known to indicate the relative user session priority. In the above UMTS example, users are taken to have the same allocation retention policy, ARP, so no differentiation based on ARP is made.

In another more complex UMTS example, it is taken in to account that different user sessions have different associated ARP values, so that the number of different QoS priority groups increases, and congestion control is applied to the various groups differently. This can be considered as altering Table 4 to include more rows so as to further differentiate users. In that more complex example, if load balancing is not possible, then as a last resort some user sessions are terminated, starting with user sessions of users of the lowest ARP.

In other UMTS examples, the operator can alter the thresholds of Table 4 to alter the restrictions, for example either in favor of RT traffic or in favor of NRT traffic.

General

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method of controlling traffic load on a link in a telecommunications network,
   the link carrying user sessions of non-real time, NRT, services and real time, RT, services,
   the method comprising periodically monitoring traffic load on the link;
   and successively restricting alternately NRT and RT traffic on said link so as to bring said load below a predetermined level, wherein:
   each of NRT and RT traffic has multiple QoS classes, each QoS class having a maximum permitted rate, and the successive alternate restriction of NRT and RT traffic comprises:
   upon an indication that said load exceeds the predetermined level, restricting more only one of NRT traffic and RT traffic by reducing maximum permitted rate in one or more specified QoS classes of said one of NRT and RT traffic; and
   upon next subsequent indication that said load exceeds the predetermined level, then restricting more only the other of NRT traffic and RT traffic by reducing maximum permitted rate in one or more specified QoS classes of said other of NRT and RT traffic,
   the method being such that following a restriction step in respect of only RT traffic, the next restriction step carried out is in respect of only NRT traffic and vice versa.

2. A method according to claim 1, wherein restricting is by reducing maximum permitted rate of user sessions of each of the selected QoS class or QoS classes in accordance with a table of predetermined maximum permitted rates to be applied to each QoS class of each of NRT and RT traffic at successive stages of traffic restriction.

3. A method according to claim 1, wherein the magnitudes of reductions in maximum permitted rates of said selected QoS class or classes of NRT and RT traffic to be applied are preselected dependent upon the extent to which NRT traffic is to be restricted as compared to RT traffic.

4. A method according to claim 1, wherein upon said load going below a lower predetermined level, relaxing restriction of traffic of at least one QoS class of one of NRT and RT traffic;
   subsequently upon said load being determined as going below said lower predetermined level, relaxing restriction of traffic of at least one QoS class of the other of NRT and RT traffic;
   the method being such that following the relaxation step in respect of one of RT and NRT traffic, the next relaxation step being in respect of the other of RT and NRT traffic.

5. A method according to claim 4, wherein relaxing is by increasing maximum permitted rate of user sessions of the selected QoS class or QoS classes.

6. A telecommunications network carrying user sessions of non-real time, NRT, and real time, RT, services, each of NRT and RT traffic having multiple QoS classes each QoS class having a maximum permitted rate,
- the network comprising a base station linked to a base station controller.
- the network comprising a control stage and an indicator of traffic load on the link, and
- the control stage being operative to successively restrict alternately NRT and RT traffic so as to bring said load below a predetermined level, wherein:
  - the control stage is responsive to an indication that said load exceeds the predetermined level, by restricting more only one of NRT traffic and RT traffic by reducing maximum permitted rate in one or more specified QoS classes of said one of NRT and RT traffic;
  - the control stage is responsive to the next subsequent indication that said load exceeds the predetermined level, by then restricting more only the other of NRT traffic and RT traffic by reducing maximum permitted rate in one or more specified QoS classes of said other of NRT and RT traffic; and
  - the control stage is configured to carry out a restriction step in respect of only NRT traffic after a restriction step in respect of only RT traffic, and vice versa.

7. A network according to claim 6, wherein the base station controller comprises a memory operative to store a table of predetermined maximum permitted rates to be applied to each predetermined QoS class of each of NRT and RT traffic at predetermined stages of the traffic restriction.

8. A network according to claim 6, wherein the control stage is operative such that upon said load going below a lower predetermined level, relaxing restriction of traffic of at least one QoS class of one of NRT and RT traffic;
- subsequently upon said load being determined as going below said lower predetermined level, relaxing restriction of traffic of at least one QoS class of the other of NRT and RT traffic;
- such that following the relaxation in respect of one of RT and NRT traffic, the next relaxation being in respect of the other of RT and NRT traffic.

9. A network according to claim 6, in which the base station controller is a Radio Network Controller, RNC, and the link is an Iub interface.

* * * * *